United States Patent [19]

Ookawa et al.

[11] Patent Number: 5,650,622

[45] Date of Patent: Jul. 22, 1997

[54] INFRARED IMAGE PICKUP DEVICE

[75] Inventors: Norio Ookawa; Susumu Takahashi, both of Kamakura; Masashi Ueno; Osamu Kaneta, both of Amagasaki, all of Japan

[73] Assignee: Mitsubishi Denki Kabushiki Kaisha, Tokyo, Japan

[21] Appl. No.: 658,799

[22] Filed: Jun. 5, 1996

[30] Foreign Application Priority Data

Jun. 6, 1995 [JP] Japan ................... 7-139340

[51] Int. Cl.$^6$ ................... H04N 5/33; G01J 5/06
[52] U.S. Cl. ................... 250/332; 250/370.08; 250/370.15
[58] Field of Search ................... 250/332, 370.08, 250/370.15, 338.4

[56] References Cited

U.S. PATENT DOCUMENTS

| | | | |
|---|---|---|---|
| 4,153,835 | 5/1979 | Lau et al. | 250/370.15 |
| 5,021,663 | 6/1991 | Hornbeck | 250/349 |
| 5,420,419 | 5/1995 | Wood | 250/370.15 |

*Primary Examiner*—Carolyn E. Fields
*Attorney, Agent, or Firm*—Wolf, Greenfield & Sacks, P.C.

[57] ABSTRACT

Circuitry for a bolometer-type image pickup device improves the signal-to-noise ratio and reduces variations of an output offset level due to temperature variations of the device. A clamp voltage is applied to an amplifier 18 via a clamping diode 36 connected thereto. This reduces a difference between an input voltage during an off-state of one of horizontal FET switches 9, 10, and an input voltage during the off-state of both horizontal FET switches 9, 10, thereby improving a signal-to-noise ratio by narrowing a frequency band of an external circuit. Further, a variable load resistor 43 whose resistance varies with temperature similarly to those of bolometers 1-4, a resistance of a pseudo resistor 44 which is substantially equal to a sum of conductive resistances of vertical FET switches 1, 14 and horizontal FET switches 9, 10, and a compensating diode 45 whose forward bias voltage varies with temperature similarly to those of pixel separating diodes 39-42 are connected in series between the horizontal FET switches 9, 10 and a bias current output terminal 12, thereby offsetting variations of an output offset level due to temperature variations.

15 Claims, 10 Drawing Sheets

INFRARED IMAGE PICKUP DEVICE

BACKGROUND OF THE INVENTION

1. Field of the Invention

This invention is intended to improve a signal-to-noise ratio (S/N) of an infrared image pickup device, and to reduce variations of an output offset level due to temperature variations of the infrared image pickup device.

2. Description of the Prior Art

Figure 1:
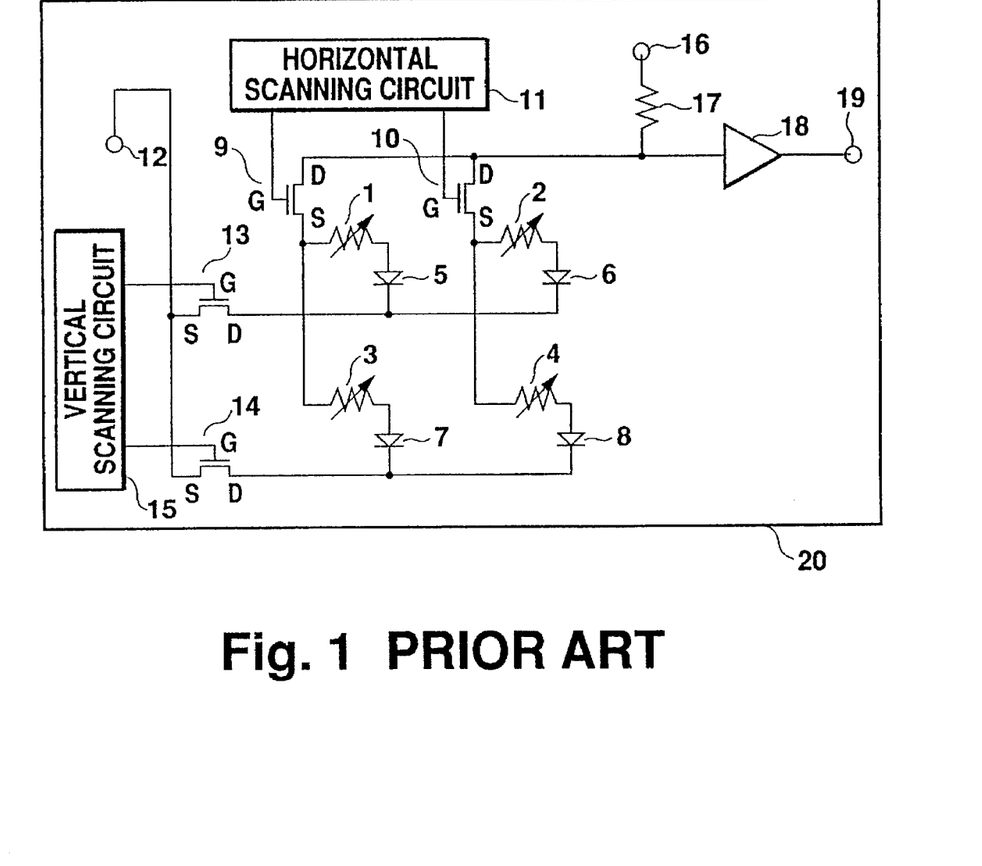
FIG. 1 is a block diagram showing the configuration of an infrared image pickup device of the prior art.
Figure 2:
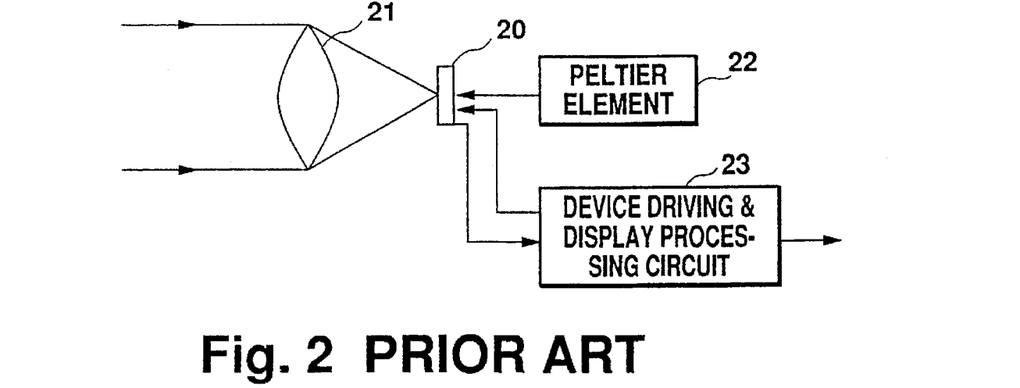
FIG. 2 is a schematic illustration showing the configuration of an infrared camera using an infrared image pickup device.

FIG. 1 of the accompanying drawings is a block diagram showing one example of an existing infrared image pickup device. The infrared image pickup device comprises: bolometers 1–4; pixel separating diodes 5–8 whose anodes are connected to the bolometers 1–4; horizontal FET switches 9 and 10 whose sources are connected to the bolometers 1–4; a horizontal scanning circuit 11 connected to gates G of the horizontal FET switches 9 and 10; a bias current output terminal 12; vertical FET switches 13 and 14 whose drains D are connected to cathodes of the pixel separating diodes 5–8 and whose sources S are connected to the bias current output terminal 12; a vertical scanning circuit 15 connected to gates G of the vertical FET switches 13 and 14; a bias current input terminal 16; a fixed load resistor 17 which is connected between drains D of the horizontal FET switches 9 and 10, and the bias current input terminal 16; an amplifier 18 whose input terminal is connected to a node between drains D of the horizontal FET switches 9 and 10, and the fixed load resistor 17; and an output terminal 19 of the amplifier 18. All of the foregoing elements are mounted on a substrate 20 made of silicon or the like. In order to simplify the description, FIG. 1 shows the infrared image pickup device having (2 2) pixels. A resistance value of the fixed load resistor 17 is set to a value which is substantially equal to a sum of resistance values of the bolometers 1–4 and conductive resistance values of the vertical FET switches 13 and 14, and those of the horizontal FET switches 9 and 10. FIG. 2 is a block diagram of an infrared camera adopting an infrared image pickup device. This camera comprises an infrared optical system 21, a substrate 20 (for mounting the infrared image pickup device), a Peltier element 22 heat-conductively contacted to the substrate 20, and a device driving and display processing circuit 23 which is connected to the horizontal scanning circuit 11, the vertical scanning circuit 15, the bias current input terminal 16, the bias current output terminal 12, and an output terminal 19. In operation, the substrate 20 is first controlled to a predetermined temperature using the Peltier element 22. The device driving and display processing circuit 23 provides clock signals to the horizontal scanning circuit 11 and the vertical scanning circuit 15. The device driving and display processing circuit 23 also applies a bias voltage between the bias current input terminal 16 and the bias current output terminal 12.

The infrared optical system 21 converges infrared rays radiated by an object to be imaged onto the substrate 20 where the bolometers 1–4 are mounted. The bolometers 1–4 absorb the infrared rays, and minute temperature rises are caused in the bolometers 1–4 in proportion to the intensities of the infrared rays. The bolometers 1–4 are made of materials such as polysilicon or vanadium oxide whose resistance extensively varies with temperature. The bolometers 1–4 change their own resistance values in accordance with the temperature rise.

Next, the vertical scanning circuit 15 provides clock signals to the vertical FET switches 13 and 14 so that the vertical FET terminal's 13 and 14 sequentially become active. The horizontal scanning circuit 11 provides clock signals to the horizontal FET switches 9 and 10 so that the horizontal FET switches 9 and 10 sequentially become active.

For example, in order to read a resistance value of the bolometer 1, the vertical FET switch 13 and the horizontal FET switch 9 will be turned on. In this case, a current sequentially flows through the bias current input terminal 16, fixed load resistor 17, horizontal FET switch 9, bolometer 1, pixel separating diode 5, vertical FET switch 13, and bias current output terminal 12. In this state, there is a bypass between the bolometer 3, pixel separating diode 7, pixel separating diode 8, bolometer 4, bolometer 2, and pixel separating diode 6, in parallel to a main path. However, this bypass is electrically disconnected, since the pixel separating diode 8 is reverse biased. Thus, a desired pixel can be selectively read out. In order to selectively read a resistance value of the bolometer 2, 3 or 4, the pixel separating diode 7, 6 or 5 will become reverse biased.

Figure 3:
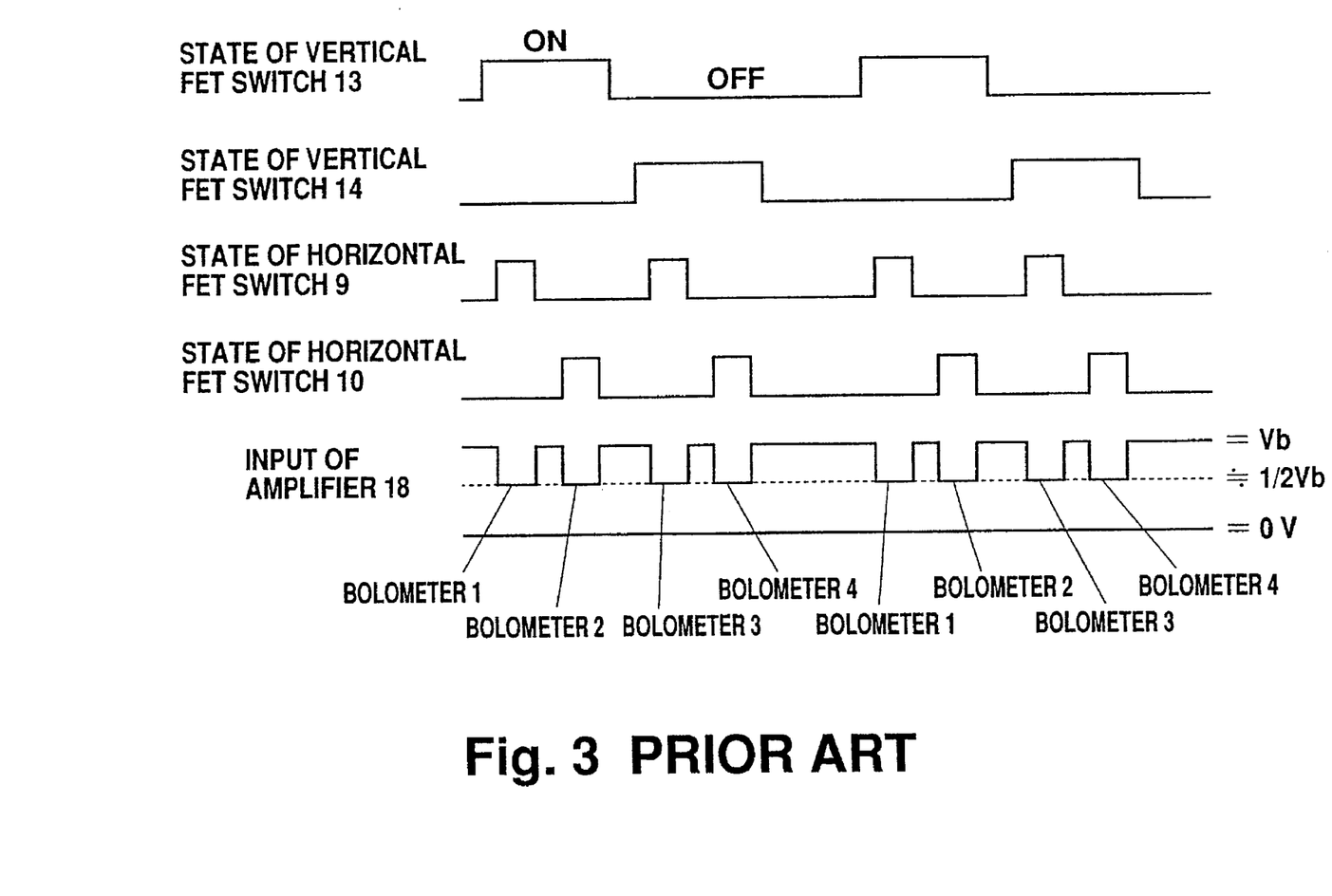
FIG. 3 is a timing chart showing the operation of vertical and horizontal FET switches, and a signal at an amplifier input.

FIG. 3 shows the relationship between read timing of the infrared image pickup device and a voltage to be applied to the amplifier 18. Signal voltages, whose levels are approximately 50% of a bias voltage and which correspond to the resistance values of the respective bolometers 1–4, minutely vary with an amount of incident infrared rays. However, while both the horizontal FET switches 9 and 10 remain inactive, the voltage applied to the amplifier 18 is raised until it becomes equal to the bias voltage. The amplifier 18 amplifies this voltage, and outputs it via the output terminal 19.

In this conventional infrared image pickup device, the signal voltage, which is applied to the amplifier 18 while either the horizontal FET switch 9 or 10 is active and whose level is approximately 50% of the bias voltage, minutely varies with the amount of infrared rays. On the other hand, while both the horizontal FET switches 9, 10 remain inactive, the signal voltage applied to the amplifier 18 is increased to the bias voltage. A difference between the levels of the signal voltages, which are applied during the on-state of the horizontal FET switch 9 or 10, and during the off-state of both the horizontal FET switches 9 and 10, is very large compared with a signal amplitude depending upon intensities of the incident infrared rays. Thus, it is necessary to increase a frequency band width of the device driving and display processing circuit 23 above a frequency band necessary for reading, thereby improving transient response characteristics. However, this disadvantageously increases noise, and reduces a signal-to-noise ratio. Further, the resistances of the bolometers 1–4, and conductive resistances of the vertical and horizontal FET switches 13, 14, 9 and 10 vary with temperature. Although the infrared image pickup device includes a mechanism for controlling the temperature of the substrate 20, offset variations, which are larger than the signal output caused by variations of infrared rays, will be outputted if the temperature of the substrate 20 changes with disturbances such as a variation of ambient temperature.

SUMMARY OF THE INVENTION

This invention is contemplated so as to overcome the foregoing problems of the prior art, and provides an infrared image pickup device which can narrow a frequency band of an external circuit, pick up images with a good signal to noise ratio, and minimize an output offset variation caused by temperature variation.

According to a first aspect of the invention, the infrared image pickup device includes a clamping diode connected between an input terminal of an amplifier and a clamp voltage input terminal.

In this infrared image pickup device, the clamping diode is connected to the input terminal of the amplifier. Thus, a difference of the voltage during the actuation of one of the horizontal transistors and the voltage during inactivation of these switches is small, so that a frequency band width of a device driving and display processing circuit can be narrowed, and images can be picked up with reduced noise and a good signal to noise ratio.

In accordance with a second aspect of the invention, the infrared image pickup device includes a variable load resistor whose resistance varies with temperature similarly to resistance values of the bolometers, a compensating diode whose forward voltage varies with temperature similarly to a forward voltage of the pixel separating diodes, and a pseudo resistor whose resistance value is substantially equal to a sum of conductive resistances of vertical and horizontal transistors, in place of the fixed load resistor in the foregoing aspect of the invention.

In this infrared image pickup device, the resistance value of the variable load resistor always varies, with temperature, so as to be equal to the resistances of the bolometers. Further, the forward voltage of the compensating diode varies, with temperature, so as to be equal to the forward voltage of the pixel separating diodes. Thus, it is possible to offset a variation of the input voltage to the amplifier caused by temperature variation of the substrate.

Therefore, the infrared image pickup device has little output offset variation caused by temperature variation of the substrate, and assures reliable operation.

According to a third aspect of the invention, the infrared image pickup device further includes a load resistor, which includes: a variable load resistor whose resistance value varies with temperature similarly to the bolometers; a compensating diode whose forward voltage varies with temperature similarly to the pixel separating diodes; a compensating vertical transistor having a conductive resistance substantially equal to a conductive resistance of the vertical transistors, with respect to temperature; a terminal for controlling the compensating vertical transistor and being connected to a gate of the compensating vertical transistor; a compensating horizontal transistor whose conductive resistance is substantially equal to a conductive resistance of the horizontal transistors with respect to temperature; and a terminal for controlling the compensating the horizontal transistors and being connected to a gate of the compensating horizontal transistor. The variable load resistor, compensating diode and compensating vertical transistor are used in this aspect in place of the fixed load resistor in the foregoing aspect of the invention.

In this infrared image pickup device, a sum of the resistance value of the variable load resistor and conductive resistances of the compensating vertical and horizontal transistors vary so as to be equal to a sum of a resistance value of one bolometer, a conductive resistance of one vertical transistor, and a conductive resistance of one horizontal transistor, with respect to temperature. Further, the forward voltage of the compensating diode varies so as to be equal to the forward voltage of the pixel separating diodes with respect to temperature. Thus, the variation of the input voltage to the amplifier caused by temperature variations of the substrate can be more precisely offset.

The invention will become more apparent from the following detailed description of presently preferred embodiments when taken in conjunction with the accompanying drawings.

DESCRIPTION OF THE PREFERRED EMBODIMENTS

Embodiment 1

Figure 4:
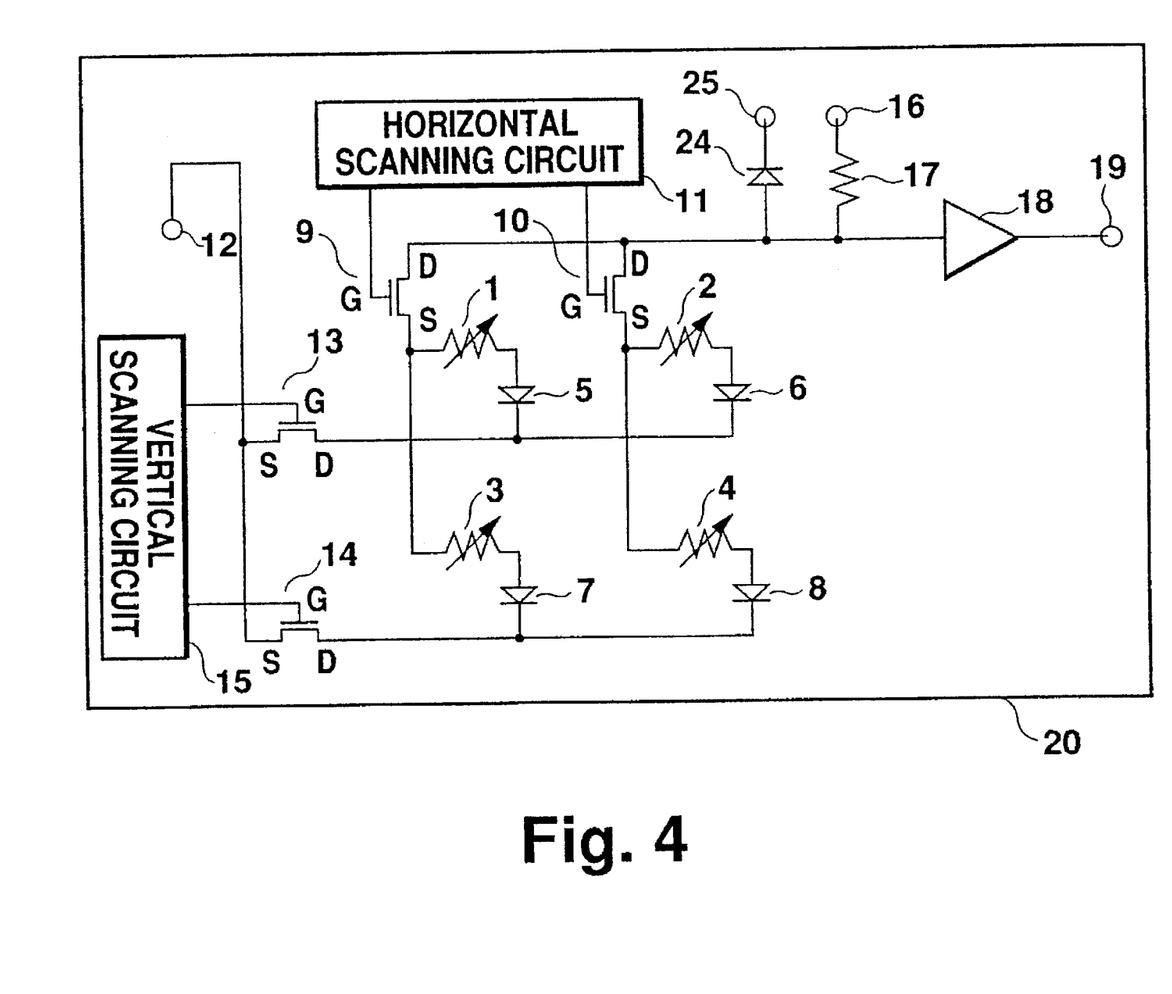
FIG. 4 is a block diagram showing the configuration of an infrared image pickup device according to a first embodiment of the invention.

An infrared image pickup device is configured as shown in FIG. 4, and comprises elements 1 to 20 which are identical to those of the infrared image pickup device shown in FIG. 1, a clamping diode 24 whose anode is connected to an input terminal of the amplifier 18, and a clamp voltage input terminal 25 connected to a cathode of the clamping diode 24. In the description of the first to sixth embodiments, it is assumed that a resistance of the fixed load resistor 17 is substantially equal to a sum of resistances of the bolometers 1–4, conductive resistances of the vertical FET switches 13, 14, and conductive resistances of the horizontal FET switches 9, 10. Further, orientations of the drains and sources of the vertical and horizontal FET switches 13, 14, 9 and 10 may be reversed. A potential of the bias current output terminal 12 is assumed to be 0 V.

Figure 5:
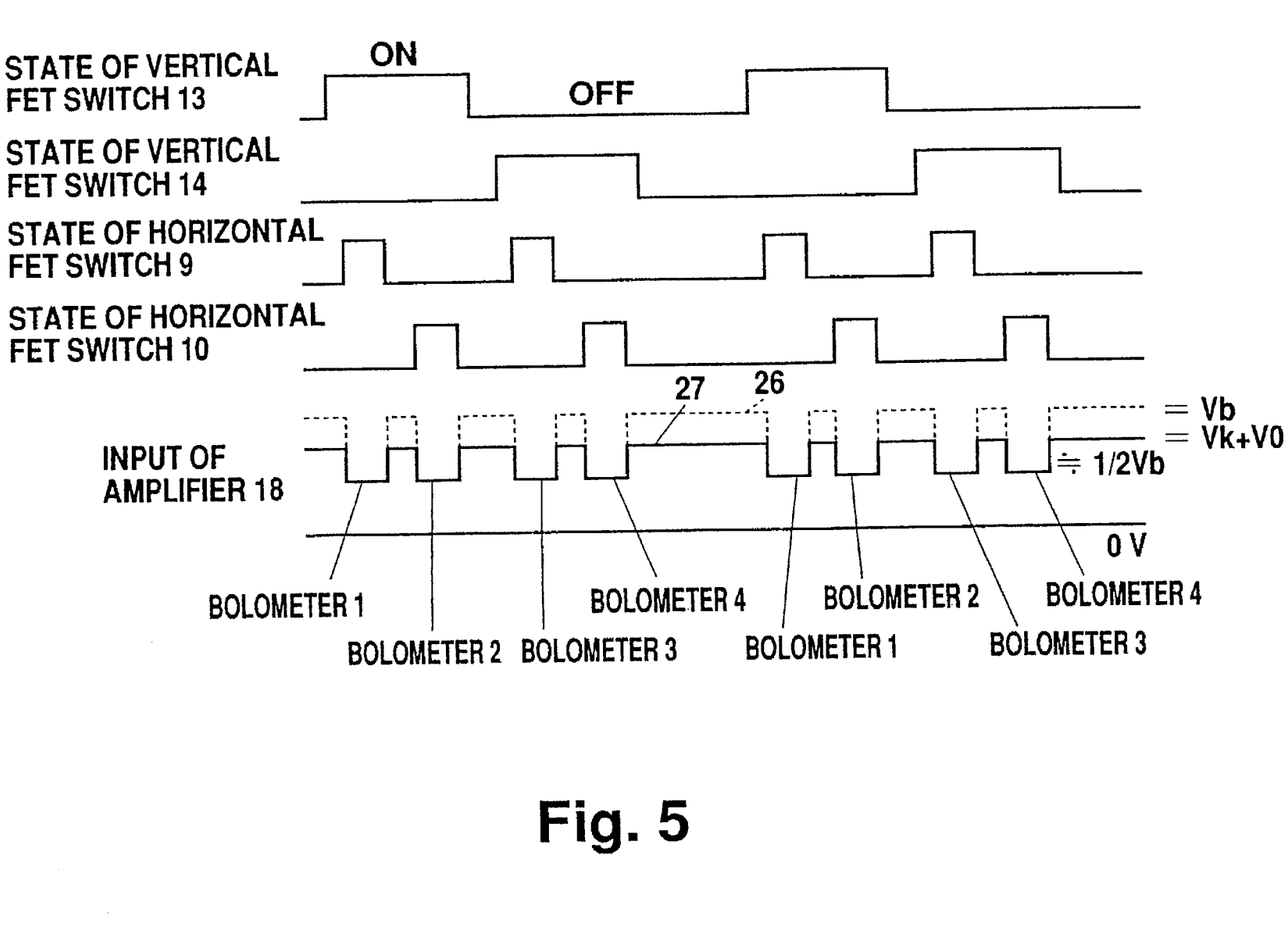
FIG. 5 is a timing chart showing the operation of vertical and horizontal FET switches, the signal at the amplifier input.

In operation, the substrate 20 is controlled to a predetermined temperature. The vertical FET switches 13, 14 and the horizontal FET switches 9, 10 are activated at times shown in FIG. 5, so that a bias current flows to the bias current output terminal 12 from the bias current input terminal 16. Signal voltages corresponding to resistances of the bolometers 1–4 are outputted from the output terminal 19. The foregoing operation is the same as that of the conventional infrared image pickup device. A clamp voltage lower than a bias voltage is applied to the clamp voltage input terminal 25. While the horizontal FET switches 9, 10 are inactive, an input voltage to the amplifier 18 is set to be higher than a signal voltage during reading, but lower than the bias voltage. FIG. 5 shows the relationship between the read timing of the infrared image pickup device and the input voltage to the amplifier 18. In FIG. 5, reference numeral 26 denotes a waveform of an input voltage to the amplifier 18 in the conventional infrared image pickup device. Reference numeral 27 denotes a waveform of the input voltage applied to the amplifier 18 in this embodiment. The input voltage, which is applied to the amplifier 18 while resistance values of the bolometers 1–4 are being read, is approximately 50% of the bias voltage as in the conventional infrared image pickup device. A forward voltage is applied to the clamping diode 24 while the horizontal FET switches 9 and 10 are inactive. Thus, the voltage lower than the bias voltage is applied to the amplifier 18, so that this voltage swings less extensively than that in the conventional infrared image pickup device.

Embodiment 2

Figure 6:
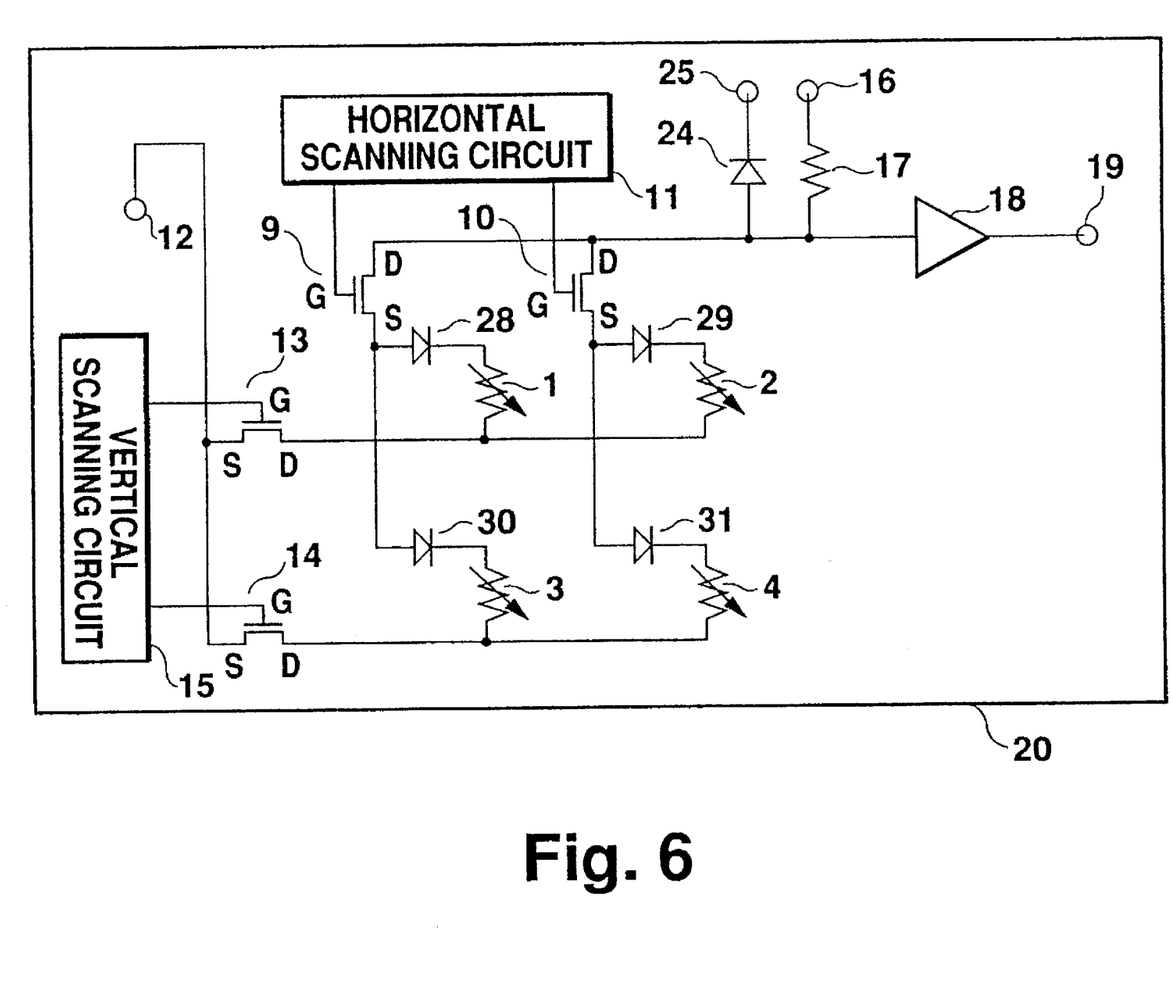
FIG. 6 is a block diagram showing the configuration of an infrared image pickup device according to a second embodiment of the invention.

An infrared image pickup device is configured as shown in FIG. 6, and comprises components 1–4 and 9–20 which are the same as those of the conventional infrared image pickup device, components 24 and 25 which are the same as those in the first embodiment, and pixel separating diodes 28–31 whose cathodes are connected to the bolometers 1–4 and anodes are connected to sources of the horizontal FET switches 9, 10.

The pixel separating diodes 28–31 electrically separate pixels during reading of the resistance values of the bolometers, similarly to the pixel separating diodes 5–8 in the first embodiment. For instance, when reading the resistance value of the bolometer 1, the vertical FET switch 13 and the horizontal FET switch 9 are turned on, thereby forming a bypass, in parallel with the main path, through the pixel separating diode 30, bolometer 3, bolometer 4, pixel separating diode 31, pixel separating diode 29 and bolometer 2. However, this bypass is electrically disconnected since the pixel separating diode 31 is reverse biased. In order to read the resistance values of the bolometers 2–4, the pixel separating diodes 30, 29 and 28 become reverse biased, thereby electrically disconnecting the bypass. The remaining operations, including the operation of the clamping diode 36, are the same as those in the first embodiment.

Embodiment 3

Figure 7:
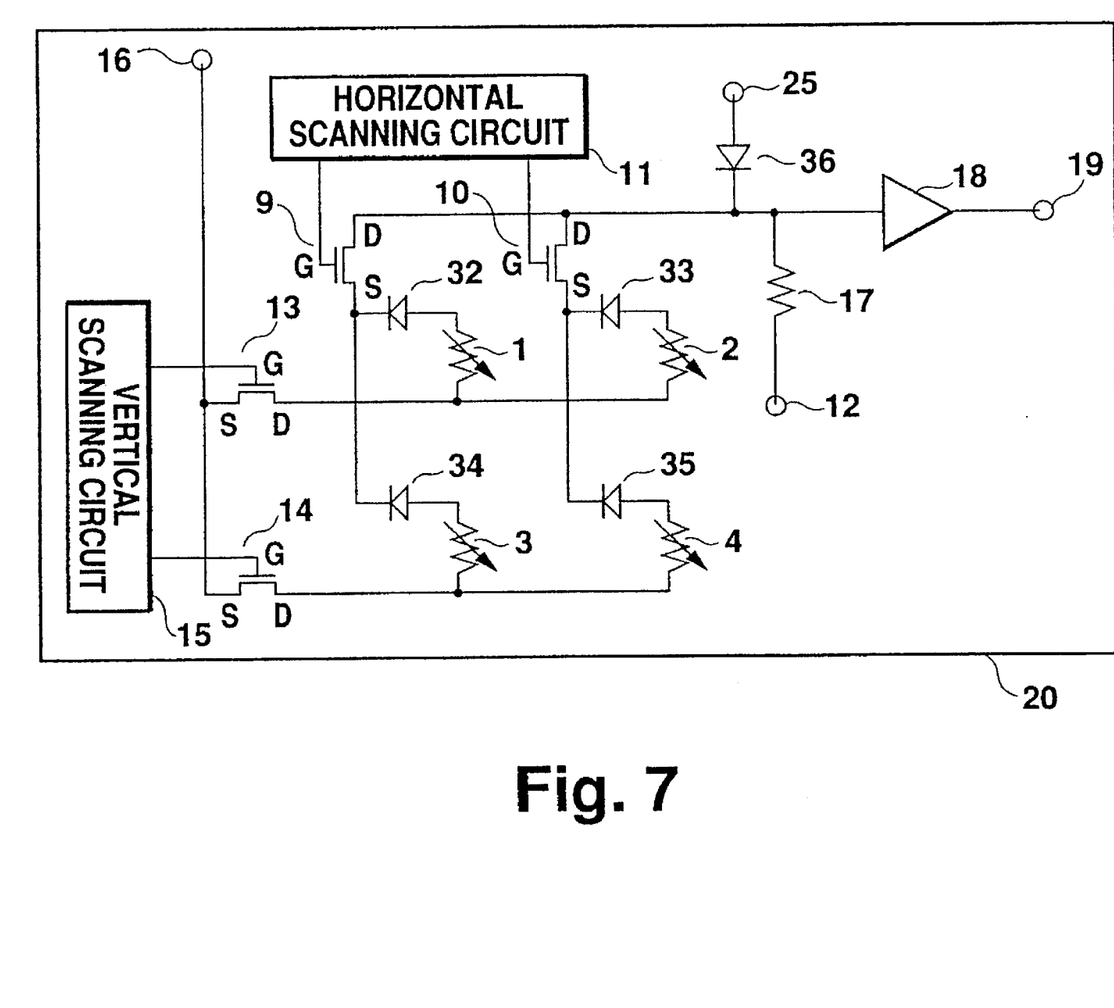
FIG. 7 is a block diagram showing the configuration of an infrared image pickup device according to a third embodiment of the invention.

According to a third embodiment, an infrared image pickup device is configured as shown in FIG. 7, and comprises components 1–4 and 9–20 (which are the same as those in the conventional infrared image pickup device), and a clamp voltage input terminal 25 (which is the same as that in the first embodiment), pixel separating diodes 32–35 having anodes connected to the bolometers 1–4 and cathodes connected to sources of the horizontal FET switches 9, 10, an amplifier 18, and a clamping diode 36 having a cathode connected to the amplifier 18. The foregoing components are mounted on a substrate 20.

Figure 8:
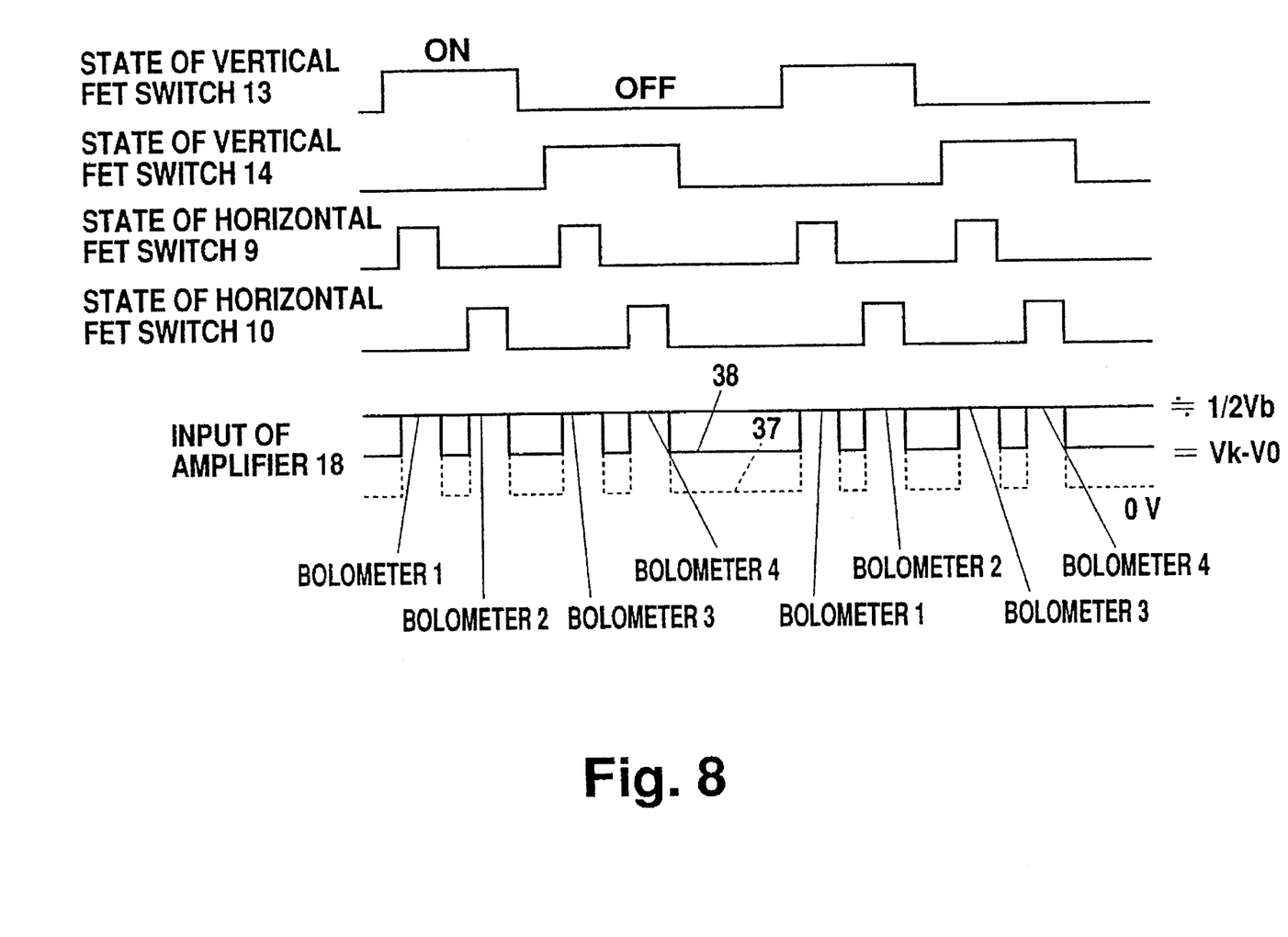
FIG. 8 is a timing chart showing the operation of vertical and horizontal FET switches, the signal at the amplifier input in the third embodiment.

In operation, the substrate 20 is controlled to the predetermined temperature. A bias current is applied from the bias current input terminal 16 to the bias current output terminal 12. This bias current flows in a direction opposite to those mentioned in the first and second embodiments. The vertical FET switches 13, 14 and the horizontal FET switches 9, 10 are sequentially turned on at times shown in FIG. 8. Signal voltages corresponding to resistance values of the bolometers 1–4 are outputted from the output terminal 19. A clamp voltage higher than 0 volts is applied to the clamp voltage input terminal 25. During the off-state of the horizontal FET switches 9, 10, an input voltage to the amplifier 18 is set to be higher than 0 volts and lower than the foregoing signal voltages during the reading. FIG. 8 shows the relationship between the read timing of the infrared image pickup device and the input voltage applied to the amplifier 18. In FIG. 8, reference numeral 37 denotes a waveform of the input voltage to the amplifier 18 in the conventional device, and reference numeral 38 denotes that of the present invention. The voltage applied to the amplifier 18 during the reading is approximately 50% of the bias voltage in the conventional device. The clamping diode 36 is forward biased while the horizontal FET switches 9, 10 are inactive. Thus, the voltage higher than 0 volts is applied to the amplifier 18, and swings less extensively than the voltage in the conventional device.

Embodiment 4

Figure 9:
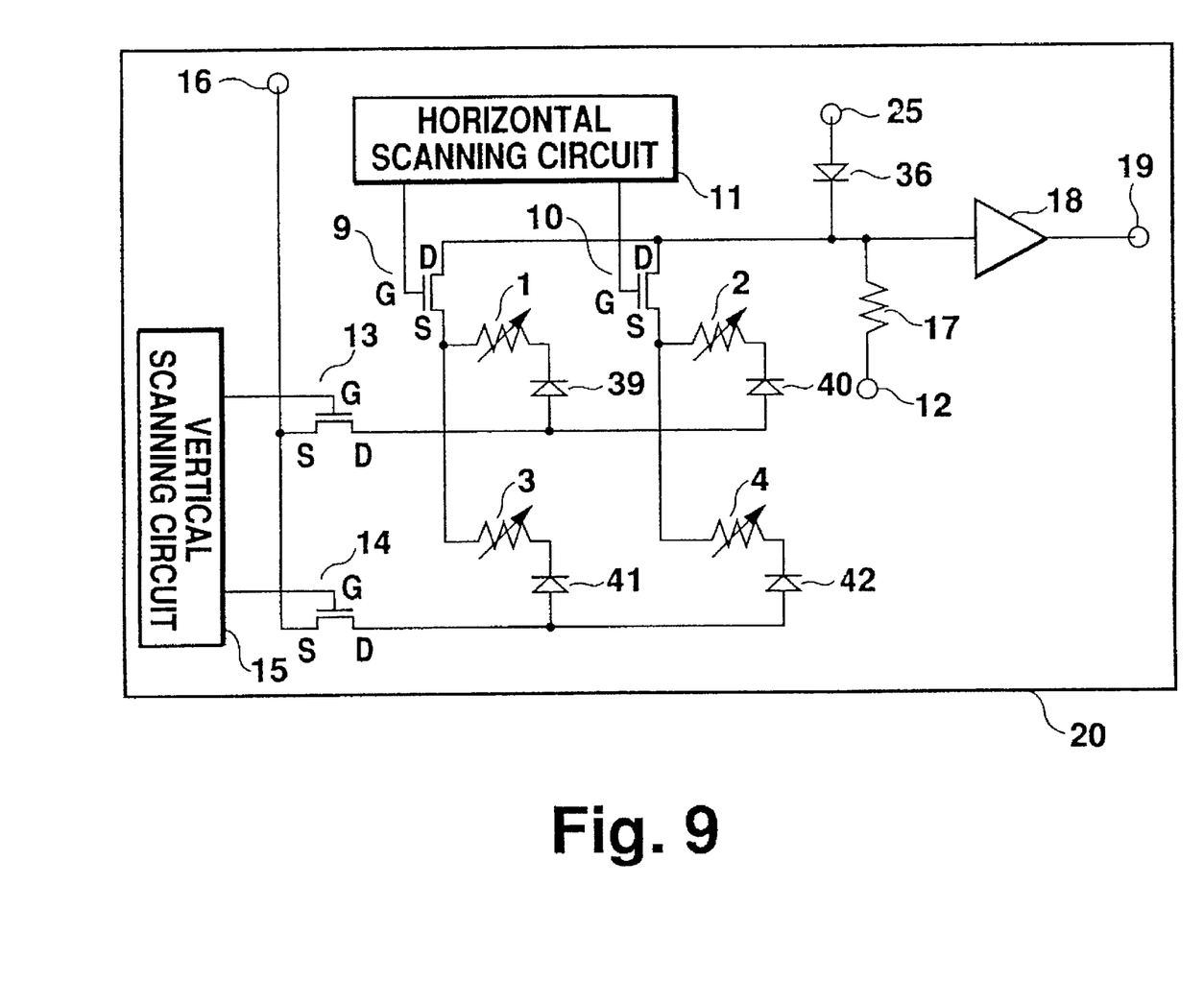
FIG. 9 is a block diagram showing the configuration of an infrared image pickup device according to a fourth embodiment of the invention.

An infrared image pickup device shown in FIG. 9 comprises components 1–4 and 9–20 which are the same as those of the conventional device, components 25 and 36 which are the same as those in the first embodiment, and pixel separating diodes 39–42 having cathodes connected to the bolometers 1–4 and anodes connected to drains of the vertical FET switches 13, 14.

In operation, the pixel separating diodes 39–42 electrically separate pixels similarly to the pixel separating diodes 32–35 in the third embodiment. For instance, when reading the resistance value of the bolometer 1, the vertical FET switch 13 and the horizontal FET switch 9 are turned on. Thus, a bypass is formed, in parallel to the main path, through the pixel separating diode 40, bolometer 2, bolometer 4, pixel separating diode 42, pixel separating diode 41, and bolometer 3. However, this bypass is electrically disconnected since the pixel separating diode 42 is reverse biased. In order to read the resistance values of the bolometers 2–4, the pixel separating diodes 41, 40 and 39 become reverse biased, thereby electrically disconnecting the bypass. The remaining operations including the operation of the clamping diode 36, are the same as those in the third embodiment.

Embodiment 5

Figure 10:
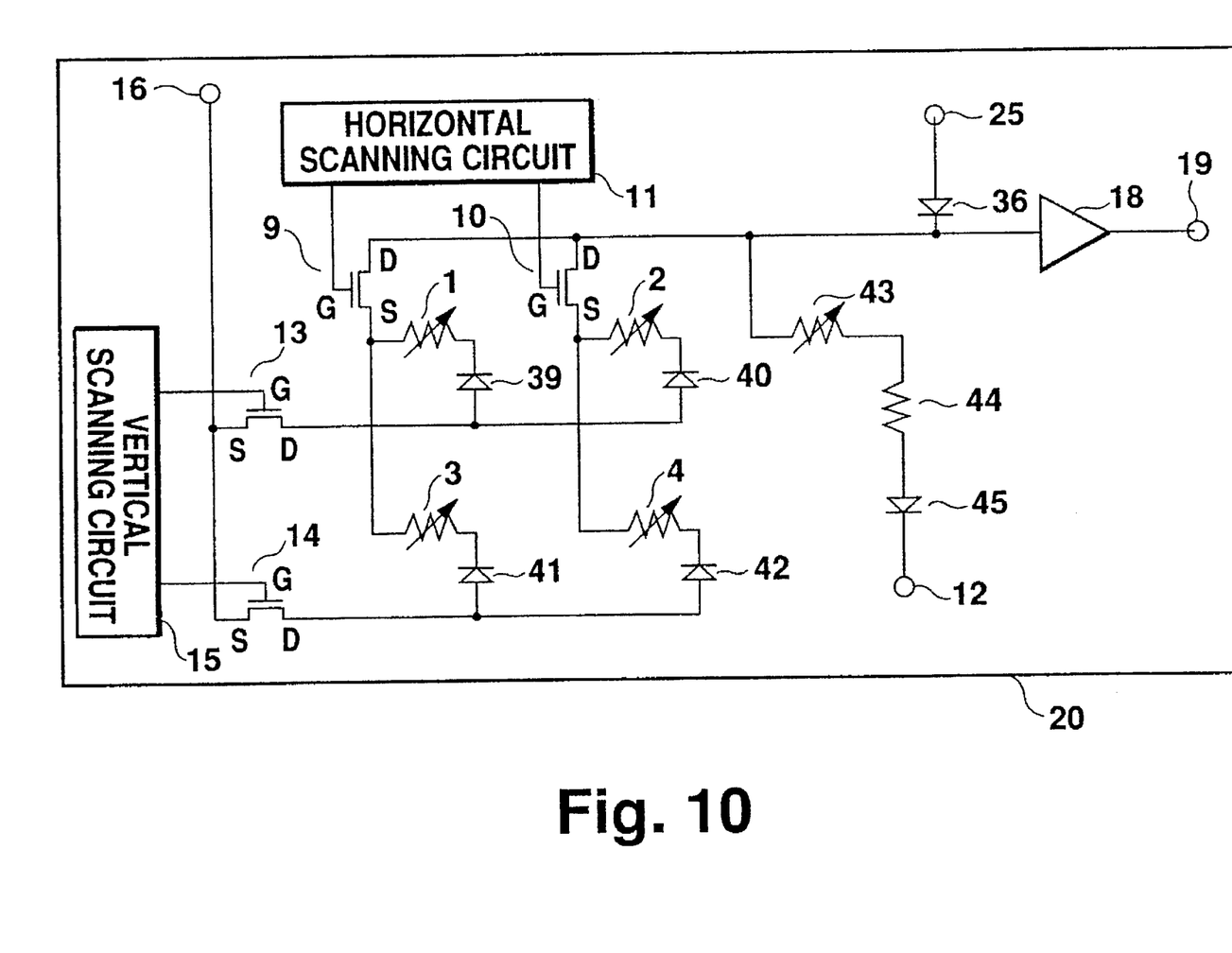
FIG. 10 is a block diagram showing the configuration of an infrared image pickup device according to a fifth embodiment of the invention.

FIG. 10 is a block diagram showing the configuration of an infrared image pickup device according to a fifth embodiment. The infrared image pickup device comprises components 1–4, 9–20, 25, 36, and 39–42 which are the same as those in the fourth embodiment, a variable load resistor 43, a pseudo resistor 44, and a compensating diode 45. The variable load resistor 43 is made of the same material as that of the bolometers 1–4 and structured similarly to the bolometers 1–4. The pseudo resistor 44 has a resistance value which is equal to a sum of a conductive resistance of the vertical FET switch 13 or 14, and a conductive resistance of the horizontal FET switch 9 or 10. The compensating diode 45 is made of the same material as those of the pixel separating diodes 39–42 and structured similarly to these pixel separating diodes 39–42.

The variable load resistor 43, pseudo resistor 44 and compensating diode 45 are connected in series between the input terminal of the amplifier 18 and the bias current output terminal 12. The compensating diode 45 is oriented such that its forward direction is the same as that of the pixel separating diodes 39–42 and that the bias current flows from the bias current input terminal 16 to the bias current output terminal 12. The variable load resistor 43 has a resistance value which is substantially equal to those of the bolometers 1–4, at respective temperatures. The compensating diode 45 has forward bias voltages, at respective temperatures, which are substantially equal to the forward bias voltages of the pixel separating diodes 39–42.

In operation, when temperature of the substrate 20 varies with disturbances in ambient temperature or the like, variations occur in: resistance values of the bolometers 1–4; conductive resistance values of the vertical FET switches 13, 14; conductive resistance values of the horizontal FET switches 9, 10; and forward bias voltages of the pixel separating diodes 39–42. Further, the variable load resistor 43 varies its resistance and the compensating diode 45 varies its forward bias voltage in a similar manner as described above. Therefore, these variations are mutually offset. An output offset can be reduced extensively compared with the conventional infrared image pickup device, and the devices in the first to fourth embodiments. The remaining operations are identical to those in the fourth embodiment.

Embodiment 6

Figure 11:
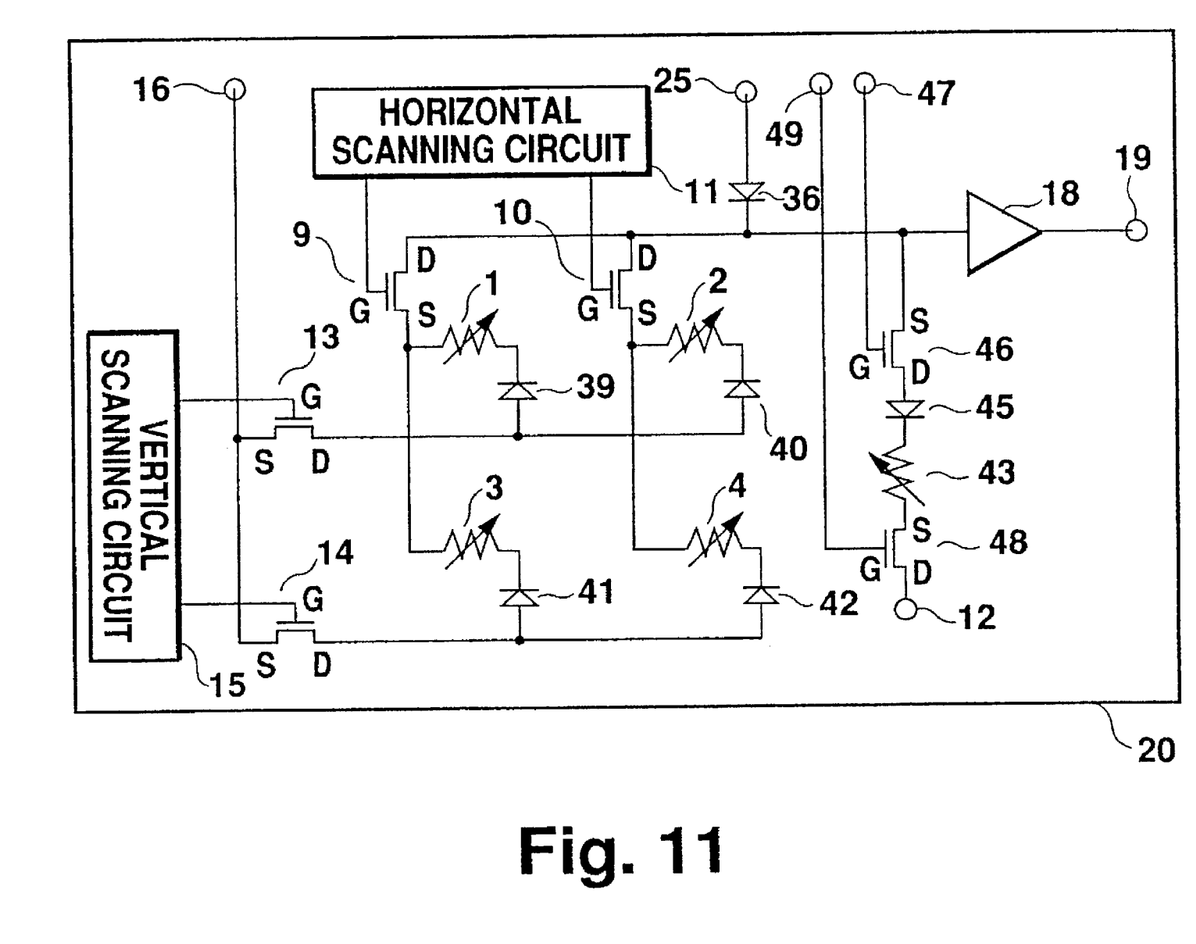
FIG. 11 is a block diagram showing the configuration of an infrared image pickup device according to a sixth embodiment of the invention.

In a sixth embodiment, an infrared image pickup device is configured as shown in FIG. 11, and comprises components 1–4, 9–20, 25, 36, 39–43 and 45 which are the same as those in the fourth embodiment, a compensating vertical FET switch 46, a compensating vertical FET switch control terminal 47, a compensating horizontal FET switch 48, and a compensating horizontal FET switch control terminal 49. The compensating vertical FET switch 46 is made of the same material as that of the vertical FET switches 13, 14 and structured similarly to those switches 13, 14. The compensating vertical FET switch control terminal 47 is connected to a gate of the compensating vertical FET switch 46. The compensating horizontal FET switch 48 is made of the same material as that of the horizontal FET switches 9, 10 and structured similarly to the horizontal FET switches 9, 10. The compensating horizontal FET switch control terminal 49 is connected to a gate of the compensating horizontal FET switch 48. The variable load resistor 43, compensating diode 45, compensating vertical FET switch 46 and compensating horizontal FET switch 48 are connected in series between the input terminal of the amplifier 18 and the bias current output terminal 12. The compensating vertical and horizontal FET switches 46 and 48 have conductive resistances which are substantially equal to those of the vertical and horizontal FET switches 13, 14, 9 and 10, respectively. The drains and sources of the vertical FET switches 13, 14, the horizontal FET switches 9, 10, the compensating vertical FET Switch 46, and the compensating horizontal FET switch 48 may be connected in reverse.

In operation, the compensating vertical FET switch control terminal 47 is applied with a voltage equal to a gate voltage for turning on the vertical FET switches 13, 14. Further, the compensating horizontal FET switch control terminal 49 is applied with a voltage equal to a gate voltage for turning on the horizontal FET switches 9, 10. When the temperature of the substrate 20 varies, the following changes occur in: resistance values of the bolometers 1–4, conductive resistance values of the vertical and horizontal FET switches, 13, 14, 9 and 10; and forward voltages of the pixel separating diodes 39–42. Further, the following variations occur in: the resistance value of the variable load resistor 43; the forward voltage of the compensating diode 45; and the conductive resistance value of the compensating horizontal FET switch 48. The foregoing variations are more precisely offset than those in the fifth embodiment, thereby extensively reducing an output offset due to temperature variation of the components.

What is claimed is:

1. An infrared image pickup device comprising:

(a) bolometers arranged two-dimensionally;

(b) vertical transistors disposed on respective columns;

(c) a vertical scanning circuit connected to first electrodes of the vertical transistors;

(d) horizontal transistors disposed on respective rows;

(e) a horizontal scanning circuit connected to first electrodes of the horizontal transistors;

(f) a first bias current terminal connected to terminals at one side of the bolometers via second electrodes and third electrodes of the vertical transistors;

(g) a second bias current terminal;

(h) a load resistor having one terminal connected to the second bias current terminal and the other terminal connected to terminals at the other side of the bolometers via second electrodes and third electrodes of the horizontal transistors;

(i) pixel separating diodes connected to the bolometers in series;

(j) an amplifier having an input terminal connected to a node between the horizontal transistors and the load resistor;

(k) an output terminal connected to an output of the amplifier;

(l) a clamp voltage input terminal;

(m) a clamping diode having one terminal connected to an input terminal of the amplifier and the other terminal connected to the clamp voltage input terminal; and (n) a substrate for supporting the elements (a) to (m) thereon.

2. The infrared image pickup device according to claim 1, wherein the first bias current terminal is a bias current output terminal, the second bias current terminal is a bias current input terminal, the bolometers have terminals at one side connected to anodes of the pixel separating diodes and terminals at the other side connected to the bias current input terminal via the horizontal transistors and the load resistor, the pixel separating diodes have cathodes connected to the bias current output terminal via the vertical transistors, and the clamping diode has an anode connected to an input terminal of the amplifier and a cathode connected to the clamp voltage input terminal.

3. The infrared image pickup device according to claim 1, wherein the first bias current terminal is a bias current output terminal, the second bias current terminal is a bias current input terminal, the bolometers have terminals at one side connected to cathodes of the pixel separating diodes and terminals at the other side connected to the bias current output terminal via the vertical transistors, the pixel separating diodes have anodes connected to the bias current input terminal via the horizontal transistors and the load resistor, and the clamping diode has an anode connected to an input terminal of the amplifier and a cathode connected to the clamp voltage input terminal.

4. The infrared image pickup device according to claim 1, wherein the first bias current terminal is a bias current input terminal, the second bias current terminal is a bias current output terminal, the bolometers have terminals at one side connected to anodes of the pixel separating diodes and terminals at the other side connected to the bias current input terminal via the vertical transistors, the pixel separating diodes have cathodes connected to the bias current output terminal via the horizontal transistors and the load resistor, and the clamping diode has a cathode connected to an input terminal of the amplifier and an anode connected to the clamp voltage input terminal.

5. The infrared image pickup device according to claim 1, wherein the first bias current terminal is a bias current input terminal, the second bias current terminal is a bias current output terminal, the bolometers have terminals at one side connected to cathodes of the pixel separating diodes and terminals at the other side connected to the bias current output terminal via the horizontal transistors and the load resistor, the pixel separating diodes have anodes connected to the bias current input terminal via the vertical transistors, and the clamping diode has a cathode connected to an input terminal of the amplifier and an anode connected to the clamp voltage input terminal.

6. An infrared image pickup device comprising:

(a) bolometers arranged two-dimensionally;

(b) vertical transistors disposed on respective columns;

(c) a vertical scanning circuit connected to first electrodes of the vertical transistors;

(d) horizontal transistors disposed on respective rows;

(e) a horizontal scanning circuit connected to first electrodes of the horizontal transistors;

(f) a first bias current terminal connected to terminals at one side of the bolometers via second electrodes and third electrodes of the vertical transistors;

(g) a second bias current terminal;

(h) a load resistor including one terminal connected to the second bias current terminal and the other terminal connected to terminals at the other side of the bolometers via second electrodes and third electrodes of the horizontal transistors;

(i) pixel separating diodes connected to the bolometers in series;

(j) an amplifier having an input terminal connected to a node between the horizontal transistors and the load resistor;

(k) an output terminal connected to an output of the amplifier; and (l) a substrate for supporting the elements (a) to (k) thereon, wherein the load resistor has: a variable load resistor whose resistance value varies with temperature similarly to resistance values of the bolometers; a pseudo resistor whose resistance value is substantially equal to a sum of a conductive resistance of one of the vertical transistors and a conductive resistance of one of the horizontal transistors; and a compensating diode whose forward bias voltage varies with temperature similarly to forward bias voltages of the pixel separating diodes.

7. The infrared image pickup device according to claim 6, wherein the first bias current terminal is a bias current output terminal, the second bias current terminal is a bias current input terminal, the bolometers have terminals at one side connected to anodes of the pixel separating diodes and terminals at the other side connected to the bias current input terminal via the horizontal transistors and the load resistor, the pixel separating diodes have cathodes connected to the bias current output terminal via the vertical transistors, and the compensating diode is oriented such that the bias current flows from the bias current input terminal to the bias current output terminal.

8. The infrared image pickup device according to claim 6, wherein the first bias current terminal is a bias current output terminal, the second bias current terminal is a bias current input terminal, the bolometers have terminals at one side connected to cathodes of the pixel separating diodes and terminals at the other side connected to the bias current output terminal via the vertical transistors, the pixel separating diodes have anodes connected to the bias current input terminal via the horizontal transistors and the load resistor, and the compensating diode is oriented such that the bias current flows from the bias current input terminal to the bias current output terminal.

9. The infrared image pickup device according to claim 6, wherein the first bias current terminal is a bias current input terminal, the second bias current terminal is a bias current output terminal, the bolometers have terminals at one side connected to anodes of the pixel separating diodes and terminals at the other side connected to the bias current input terminal via the vertical transistors, the pixel separating diodes have cathodes connected to the bias current output terminal via the horizontal transistors and the load resistor, and the compensating diode is oriented such that the bias current flows from the bias current input terminal to the bias current output terminal.

10. The infrared image pickup device according to claim 6, wherein the first bias current terminal is a bias current input terminal, the second bias current terminal is a bias current output terminal, the bolometers have terminals at one side connected to cathodes of the pixel separating diodes and terminals at the other side connected to the bias current output terminal via the horizontal transistors and the load resistor, the pixel separating diodes have anodes connected to the bias current input terminal via the vertical transistors, and the compensating diode is oriented such that the bias current flows from the bias current input terminal to the bias current output terminal.

11. An infrared image pickup device comprising:

(a) bolometers arranged two-dimensionally;

(b) vertical transistors disposed on respective columns;

(c) a vertical scanning circuit connected to first electrodes of the vertical transistors;

(d) horizontal transistors disposed on respective rows;

(e) a horizontal scanning circuit connected to first electrodes of the horizontal transistors;

(f) a first bias current terminal connected to terminals at one side of the bolometers via second electrodes and third electrodes of the vertical transistors;

(g) a second bias current terminal;

(h) a load resistor including one terminal connected to the second bias current terminal and the other terminal connected to terminals at the other side of the bolometers via second electrodes and third electrodes of the horizontal transistors;

(i) pixel separating diodes connected to the bolometers in series;

(j) an amplifier having an input terminal connected to a node between the horizontal transistors and the load resistor;

(k) an output terminal connected to an output of the amplifier; and (l) a substrate for supporting the elements (a) to (k) thereon, wherein the load resistor has: a variable load resistor whose resistance value varies with temperature similarly to resistance values of the bolometers; a compensating vertical transistor having a conductive resistance varying with temperature substantially similarly to a conductive resistance of the vertical transistors;

a terminal for controlling the compensating vertical transistor and being connected to a first electrode of the compensating vertical transistor; a compensating horizontal transistor having a conductive resistance varying with temperature substantially similarly to a conductive resistance of the horizontal transistors; a terminal for controlling the compensating horizontal transistor and being connected to a first electrode of the compensating horizontal transistor; and a compensating diode whose forward bias voltage varies with temperature similarly to resistance values of the pixel separating diodes.

12. The infrared image pickup device according to claim 11, wherein the first bias current terminal is a bias current output terminal, the second bias current terminal is a bias current input terminal, the bolometers have terminals at one side connected to anodes of the pixel separating diodes and terminals at the other side connected to the bias current input terminal via the horizontal transistors and the load resistor, the pixel separating diodes have cathodes connected to the bias current output terminal via the vertical transistors, and the compensating diode is oriented such that the bias current flows from the bias current input terminal to the bias current output terminal.

13. The infrared image pickup device according to claim 11, wherein the first bias current terminal is a bias current output terminal, the second bias current terminal is a bias current input terminal, the bolometers have terminals at one side connected to cathodes of the pixel separating diodes and terminals at the other side connected to the bias current output terminal via the vertical transistors, the pixel separating diodes have anodes connected to the bias current input terminal via the horizontal transistors and the load resistor, and the compensating diode is oriented such that the bias current flows from the bias current input terminal to the bias current output terminal.

14. The infrared image pickup device according to claim 11, wherein the first bias current terminal is a bias current input terminal, the second bias current terminal is a bias current output terminal, the bolometers have terminals at one side connected to anodes of the pixel separating diodes and terminals at the other side connected to the bias current input terminal via the vertical transistors, the pixel separating diodes have cathodes connected to the bias current output terminal via the horizontal transistors and the load resistor, and the compensating diode is oriented such that the bias current flows from the bias current input terminal to the bias current output terminal.

15. The infrared image pickup device according to claim 11, wherein the first bias current terminal is a bias current input terminal, the second bias current terminal is a bias current output terminal, the bolometers have terminals at one side connected to cathodes of the pixel separating diodes and terminals at the other side connected to the bias current output terminal via the horizontal transistors and the load resistor, the pixel separating diodes have anodes connected to the bias current input terminal via the vertical transistors, and the compensating diode is oriented such that the bias current flows from the bias current input terminal to the bias current output terminal.

* * * * *

UNITED STATES PATENT AND TRADEMARK OFFICE
CERTIFICATE OF CORRECTION

PATENT NO. : 5,650,622

DATED : July 22, 1997

INVENTOR(S): Norio Ookawa, Susumu Takahashi, Masashi Ueno and Osamu Kaneta

It is certified that error appears in the above-identified patent and that said Letters Patent is hereby corrected as shown below:

In the Abstract: line 6 change "off-state: to -- on-state --.
line 14 change "FET switches 1, 14" to -- FET switches 13, 14 --.

Column 7, line 55 after "45;" insert -- and the conductive resistance value of compensating vertical FET switch 46; --.

Signed and Sealed this

Twenty-seventh Day of January, 1998

*Attest:*

BRUCE LEHMAN

*Attesting Officer*  *Commissioner of Patents and Trademarks*